Patented Sept. 13, 1932

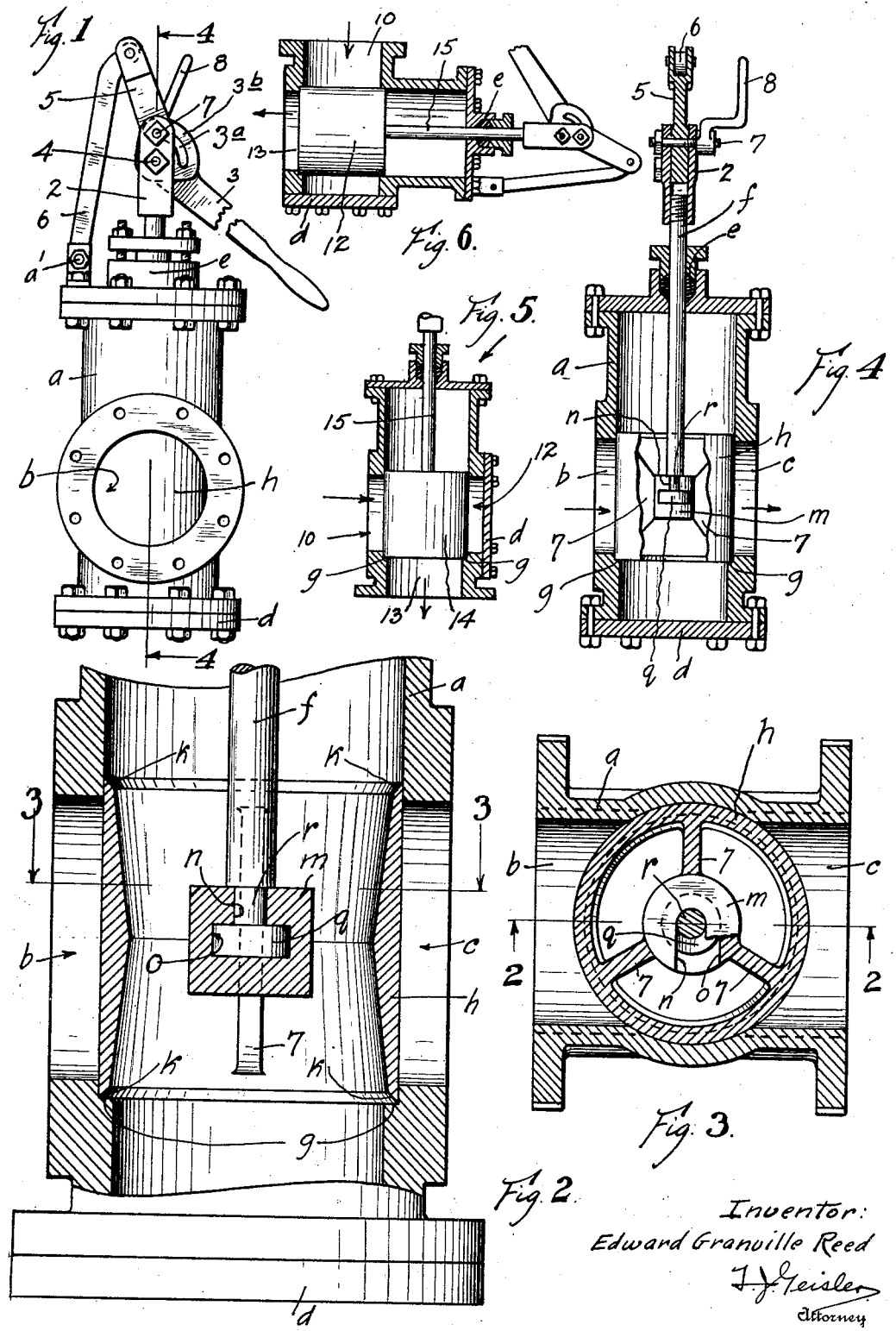

1,877,589

UNITED STATES PATENT OFFICE

EDWARD GRANVILLE REED, OF CAMAS, WASHINGTON

HOLLOW CYLINDRICAL VALVE

Application filed March 3, 1930. Serial No. 432,809.

My invention relates to valves for controlling the flow of heavily laden liquids in a pipe line, such as pulp stock in a paper mill.

The valves heretofore used for this purpose have been inadequate, in that the stock tends to accumulate on the valve seat and prevent the valve member from seating closely thereon, so that the valve can not be completely closed and will leak.

Further, in controlling the flow of the heavy stock in the pipe line, it is desirable that a rapid acting valve be used in order that the flow may be shut off substantially at a given instant, otherwise, as when the valve is used for filling the beater tub with stock, the valve, if not closed at the moment the tub is filled, will cause the latter to overflow.

One of the objects of my invention is to provide a simple, rapid acting valve which is especially adapted for controlling the flow of heavy stock, and which is so constructed as to automatically clear the stock which may have accumulated on the valve seat as it is closed, whereby a fluid tight closure will be made under all circumstances, and hence the valve will not leak.

Another object of my invention is to provide such a valve adapted to be securely and instantly locked in any position in which it may be placed, and the providing of efficient means for this purpose is one of the important and essential features of my invention.

Further, the above mentioned features render my valve adapted for ready inspection and repair while in use, so that when such repair or inspection is necessary, the pipe line will not have to be taken out of service, though the valve is under pressure.

I attain these objects in a valve consisting of, a reciprocable valve member provided with a projecting stem, an operating lever pivoted to said stem, a link pivoted at one end to the adjacent end of the valve casing and pivoted at its opposite end to the extremity of said operating lever, and means for securing the operating lever in any position to which moved.

The above mentioned and incidental features, also the operation of my valve are hereinafter fully described with reference to the accompanying drawing.

In the drawing:

Fig. 1 shows a side elevation of my improved valve illustrating the valve in the closed position;

Fig. 2 shows an enlarged central longitudinal section taken on the line 2—2 of Fig. 3;

Fig. 3 shows a reduced section taken on the line 3—3 of Fig. 2;

Fig. 4 shows a section taken on the line 4—4 of Fig. 1 and illustrates the detachable stem and connection therefor of my valve; and Figs. 5 and 6 show in central longitudinal sections how my valve may be adapted for angular connections without substantial change.

Referring now to Figs. 1 to 4; my valve consists of a cylindrical valve housing $a$ open at each end and provided with opposite alined ports $b$, $c$. One end of the housing is closed by a plate $d$ and on the other end is closed by a stuffing box $e$, through which the valve stem $f$, hereinafter described, extends.

A circumferential valve seat $g$ is provided adjacent the interior lower end of the housing and a hollow cylindrical valve $h$ is reciprocably seated within the bore of the housing $a$, one end of which is adapted when closed to rest closely on the said valve seat $g$. The ends of the valve $h$ are provided with interior beveled surfaces $k$ forming cutting edges, whereby as the valve is reciprocated in the housing, the walls will be scraped clean of any stock which may cling thereto and the lower cutting edge will dislodge any stock which may have collected on the valve seat $g$ and thus permit the valve $h$ to always rest closely on its seat and hence will not leak when closed.

The valve $h$ is provided with interior radial arms 7 integral with which is a central block $m$, provided with a longitudinal recess $n$ and a central entrance slot $o$. The interior wall of the valve $h$ is preferably tapered longitudinally towards its ends from the center, and the webs of the arms 7 are flared longitudinally of the valve for strength.

The valve stem $f$, is provided with a head $q$, having a neck $r$ of which is of lesser diameter than the stem, and is adapted to be inserted laterally in the recess n of the block m of the valve thereby to place q in the slot o rendering the valve stem conveniently and easily detachable while in service, if necessary by merely removing the stuffing box e when the valve is closed.

The projecting end of the valve stem f is provided with a forked member 2 to which is pivoted the operating handle 3 by a bolt 4. The handle 3 is provided with an extension 5 pivoted to a supporting arm 6, pivoted on the valve housing as at a'. The handle 3 is provided with an off set portion 3b provided with an arcuate slot 3a adjacent the bolt 4, through which slot a bolt 7 is inserted and secured in the forked member 2. A clamping lever 8 is threaded on the bolt 7, by means of which the valve h may be instantly locked in any desired position as may be required, and the closing of the valve assumed without manually holding the valve in closed position.

It will be evident that the pressure of the material flowing through my valve in the direction of the arrows in Figs. 2 and 4 will tend to hold the valve h firmly in its seat g without however imposing, in so doing, any appreciable resistance to the opening or closing of the valve by means of the handle 3. The valve h cannot become clogged because being hollow, it permits the heavy stock to pass upwardly through it when it is closed and does not trap and press the stock on the valve seat against the adjacent wall of the valve housing.

In case of wear of the valve tending to cause it to leak, all required to be done would be to rim out the interior of the valve housing, remove the old valve from the stem and substitute a valve of greater cross section in its place. To this end I make my valve detachable from its stem so that the valve can be removed without dismantling the valve operating mechanism or in case there is a break in the valve stem, the valve need not be removed but a new valve stem may be substituted in the place of the one broken.

Referring now to Figs. 5 and 6: I have illustrated my valve adapted for angular position in the pipe line, by merely removing the plate d, shown in Figs. 1, 5, and 6, from the lower end of the valve and securing it to either the port 10 or 12 as may be desirable, so that the open end 13 then becomes the outlet port and the stock will then flow as shown by the arrows. In this form the inspection and repair of the valve 14 and stem 15 is also permitted when closed but while there is still pressure in the pipe line.

Obviously, to change my valve from an upright to a horizontal position, it will only be necessary to make the requisite changes in position of the plate d, as illustrated in Fig. 6, since my valve will operate with equal efficiency in any position.

I claim:

1. In a valve, a reciprocable valve member provided with a projecting stem, an operating lever pivoted to said stem, a link pivoted at one end to the adjacent end of the valve casing and pivoted at its opposite end to the extremity of said operating lever, said lever provided with an offset portion adjacent its pivotal connection with the valve stem, said offset portion provided with an arcuate slot, a bolt carried by the valve stem extending through said slot, and a clamping lever threaded on said bolt for locking the operating lever in any position to which moved.

2. In a gate valve the combination of, a hollow cylindrical body closed at its ends and provided in its sides with oppositely located alined ports, a hollow cylindrical slide valve reciprocable in said body seating at one end of the latter to close said ports, the valve provided with interior arms, a stem connected to said arms and projecting thru the head of the valve body, an operating lever pivotally mounted on said projecting stem end, a link pivotally connecting the extremity of said lever with the valve body, the said lever being angular, whereby the valve is firmly held on its seat when closed and means for clamping said lever in place on the valve stem.

EDWARD GRANVILLE REED.